United States Patent [19]

Ehret

[11] 3,795,320

[45] Mar. 5, 1974

[54] FILTER ELEMENT CONSTRUCTION

[75] Inventor: Gordon F. Ehret, Alhambra, Calif.

[73] Assignee: Swimquip, Inc., El Monte, Calif.

[22] Filed: Mar. 6, 1972

[21] Appl. No.: 231,989

[52] U.S. Cl. .......... 210/486
[51] Int. Cl. .......... B01d 27/00
[58] Field of Search .......... 210/486, 323; 55/489

[56] References Cited

UNITED STATES PATENTS

| | | | |
|---|---|---|---|
| 2,028,466 | 1/1936 | Moran | 210/486 |
| 3,486,627 | 12/1969 | Ashby et al. | 210/486 |

*Primary Examiner*—Samih N. Zaharna
*Assistant Examiner*—F. F. Calvetti
*Attorney, Agent, or Firm*—D. Gordon Angus; Donald D. Mon

[57] ABSTRACT

A grid unit for supporting a filter element used in a liquid filter comprises vertical supporting struts crossed by horizontal ribs positioned to cause the liquid to flow in a serpentine manner. A narrow slot at an end of the grid structure controls the flow of the liquid between the grid and a collecting trough. Rectangular construction of the grid unit facilitates joining a plurality of units to enlarge the area of the grid.

12 Claims, 7 Drawing Figures

FILTER ELEMENT CONSTRUCTION

This invention relates to filter elements and particularly to supporting grid structures for such elements.

It is well-known to assemble a filter for filtering liquids such as swimming pool water by use of a tank in which is placed a number of filter elements each comprising a support covered by a mesh material such as fabric or the like, which encloses an interior chamber within it so that liquid pumped into the tank is forced to flow through the mesh and into the interiors of all the filter elements from where the filtered liquid is collected and led out of the tank. The mesh material is ordinarily coated with a filtering substance, usually a powdered diatomaceous earth.

It is also a common practice to clean such filters periodically to remove accumulated dirt and undesired material captured by the diatomaceous earth coating, and this is commonly done by reversing the liquid flow through the filter to wash away the diatomaceous earth coatings from the fabric surfaces.

In such normal filtering and backwashing operations, the liquid is usually sent into the filter under some pressure, and there is a tendency for the liquid to flow at a greater rate through some areas of the fabric than through other areas. Such uneven flow is undesirable, as it reduces the filtering and backwashing efficiency.

In a previous arrangement the filter tank was placed with its central longitudinal axis in a horizontal position and a number of filter elements of a generally circular form were placed with their central hubs mounted on a collection tube lying along this axis so that in the normal filtering condition the liquid filtered through the fabric of the elements was collected at the central collection tube. It was sought to meter or control the flow into the collection tube by a narrow passageway at each element. Since these passageways had to be located near the central axis they were necessarily of small extent and flow control was imperfect especially when backwashing. In fact, during backwashing the flow control passageways were not effective to remove the coatings on the fabric except over a minor part of the fabric area. Hence, it was necessary to rotate the elements in the tank in order to complete the backwashing.

It is desirable not to have to rotate the filter elements, and it is also desirable under many circumstances to be able to position a filter tank with its longitudinal axis vertical instead of horizontal and with the filter elements extending parallel to the vertical axis.

It is also desirable in some instances to use in a filter tank, filter elements differing in size. For example, when the filter elements are positioned parallel to the central axis of a cylindrical tank, those which are located near diameter of the circular cross-section of the tank will be larger than those on either side. But for assembly purposes it is desirable to make the supporting structures of all the filter elements from units of equal size.

An object of the present invention is to provide a filter in a tank whose central axis can be placed vertical and whose filter elements lie in planes parallel to the control axis.

Another object is to make provision for controlling the flow through the individual filter elements to make them substantially uniform in both directions of flow.

Another object is to provide a filter supporting unit which can be assembled with other similar units to build a support of larger size than that of a single unit.

The invention is carried out by provision of a rectangular-shaped supporting grid unit provided with a number of parallel, spaced struts to which are attached a number of spaced ribs crossing and fixed to the studs. The fabric or mesh material for the filter element is wrapped around the grid so that the material is formed into two parallel rectangular sides spaced apart from each other by the grid, enclosing an interior compartment within the mesh material.

The ribs are located so that each rib is in contact with one of the sides of the mesh material but does not extend as far as the other side, and the ribs in contact with one side alternate with the ribs in contact with the other side, thereby permitting serpentine or tortuous flow of liquid within the filter element past the ribs.

A feature of the grid unit resides in the provision of a trough at one end thereof into which filtered liquid within the tank is delivered through a controlling or metering slot extending substantially the width of the unit which controls the rate of flow between the filter element interior and the trough. The liquid collected by the troughs of all the elements is brought out of the filter tank as filtered liquid. During backwashing, the direction of flow is reversed and the metering slots of the respective filter elements operate in the same way to control the flow.

The feature of forming the filter grids of all the elements from the rectangular grid units of uniform size permits a side of one such grid unit to be abutted against the side of another such grid unit and attached to each other as by welding. This results in a grid structure of enlarged size to support the wrapping of mesh material.

The foregoing and other features of the invention will be better understood from the following detailed description and the accompanying drawing of which:

Figures 1, 2, 3, 4, 5, 6, 7:
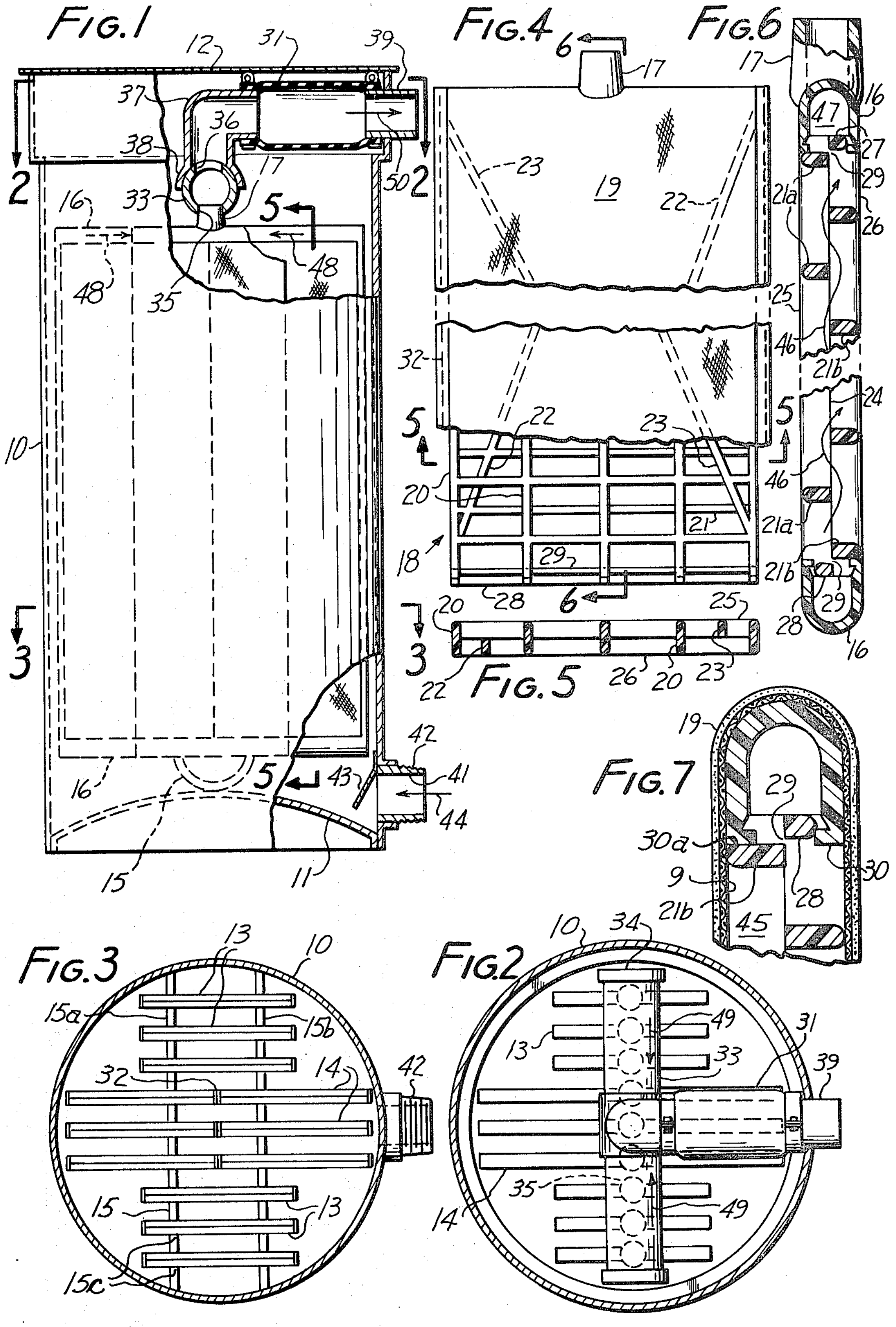
FIG. 1 is a front elevation view partially in section and partially cut-away of a filter tank containing filter elements having grid supporting structures according to this invention.
FIG. 2 is a cross-section view taken at line 2—2 of FIG. 1.
FIG. 3 is a cross-section view taken at line 3—3 of FIG. 1.
FIG. 4 is an elevation view of a filter element used in the filter of FIG. 1, the filtering fabric being partially broken away to reveal the supporting grid structure.
FIG. 5 is a cross-section view taken at line 5—5 of FIG. 4.
FIG. 6 is a cross-section view taken at line 6—6 of FIG. 4 except that the filtering fabric is not shown.
FIG. 7 is a detail view showing an end of the filter element of FIG. 4.

Referring to the drawing, FIGS. 1, 2 and 3 shows a filter comprising a cylindrical tank 10 closed at the bottom by a base 11 and at the top by a cover 12. Within the tank there are placed a number of filter elements 13 all of the same size, and a number of other filter elements 14 all of the same size but larger than the elements 13. Each of these filter elements is of a rectangular shape with its longest dimension vertical and its width extending in a horizontal direction and with a thickness much less than its width. All these filter elements are placed parallel to each other and spaced substantially equal distances apart in the tank. The difference between elements 13 and 14 is that elements 14 are shown substantially twice the width of elements 13. Thus, elements 14 are placed nearest the diameter of the circle of the tank cylinder and the shorter elements 13 are placed on opposite sides of the group of elements 14, so that all of the elements in their spaced positions from each other substantially occupy the interior of the tank. Each of elements 14 can conveniently be built up of two elements like 13, as will be explained in more detail hereinafter.

The groups of filter elements 13 and 14 are supported in their positions within the tank by having their lower edges rested on the edges of a semi-cylinder 15 such as, for example, can be formed by cutting the length of pipe longitudinally along a diameter. This member 15 is placed with its rounded portion resting at the center of the tank bottom 11 and extending to the opposite sides of the tank to which it is secured, for example, by welding. To maintain the spacing of the filter elements, the edges 15*a* and 15*b* of member 15 are notched at the proper positions 15*c* to receive the lower edges of the filter elements and prevent them from shifting toward or away from each other.

The lower edge of each of the filter elements terminates in a rounded trough 16 to fit into the correspondingly rounded notches 15*c*. The upper edge of each of the filter elements is constructed similar to the lower edge in that it comprises a similar rounded trough 16, at the upper central position of each of which there is fitted a mouth opening 17 which may be in the form of a pipe nipple fitted to and welded to the trough 16 so that there is communication between the mouth 17 and the trough.

Details of construction of the filter elements are illustrated in FIGS. 4 through 7. FIG. 4 shows a filter grid structure 18 according to this invention, covered by a screen 9 which is covered by a fabric 19 which is a well-known type of material having a fine mesh adapted to be coated by a filtering substance, ordinarily a powdery diatomaceous earth which provides extremely minute interstices or spaces through which liquid can flow, while blocking and collecting undesirable suspended particles of dirt or the like, and even bacteria. The use of such fabric is well known, needing no further discussion here.

The structure of grid 18 comprises a number of vertically extending struts 20 spaced from each other preferably about equal distances apart, and a number of horizontally extending ribs 21 spaced apart from each other preferably by equal distances, so that the horizontal parallel ribs and the vertical parallel struts form the grid 18 of rectangular shape. To impart greater rigidity, a member 22 extends diagonally from a position near the lower left side of the rectangle to a position near the upper right side of the rectangle, and similarly a second diagonal 23 extends from a position at the lower right side of the rectangle to a position at the upper left side of the rectangle. These diagonal reinforcing members 22 and 23 cross most of the ribs and the vertical struts within the rectangle. At each position where a strut or a rib or a reinforcing member crosses or contacts another member of the grid, means is provided for making a rigid fastening. This is preferably accomplished by making the entire grid structure of a molded plastic so that all the struts, ribs and reinforcing members are parts of one integral piece.

Each of the struts 20 is dimensioned so that one of the edges of each strut lies in a vertical plane 25, and the other of the edges of each strut lies in a vertical plane 26. The dimension of each strut extending from plane 25 to plane 26 is herein referred to as "the thickness of the strut."

The ribs 21, on the other hand, are formed in two sets, the individual ribs of one set alternating with the individual ribs of the other set. The ribs 21*a* of one of the sets all extend from the central vertical plane 24 of the grid structure to the plane 25 in which one of the edges of each strut 20 lies, and the individual ribs 21*b* of the other set extend from the central plane 24 to the plane 26 in which the opposite edges of each of the struts 20 lies. This arrangement of the rib structure is illustrated in FIG. 6, which is somewhat enlarged with reference to FIG. 4.

The uppermost horizontal rib 27 and the lowermost horizontal rib 28 are constructed and positioned somewhat different from the other ribs. Rib 27, positioned on the same side of the central plane 24 as the ribs 21*b*, although commencing at the central plane, does not extend outwardly as far as the plane 26, and similarly, the rib 28 at the same side of the central plane as the ribs 21*a* commences at the central plane but does not extend outwardly as far as plane 25. Furthermore, the rib 27 is placed close to the adjacent one of ribs 21*a*, and similarly, the rib 28 is placed close to the adjacent rib 21*b*, leaving a correspondingly narrow space 29 therebetween.

Troughs 16 are U-shaped, and the edges of the U are formed into inwardly extending portions 30 and 30*a*, (FIG. 7) so dimensioned that the inner part of member 30 engages rib 28 (or 27) while the upper surface of portion 30a engages the adjacent surface of the end rib 21*b* (or 21*a*). The members 30 and 30*a* are fastened to their respective ribs, preferably by welding. Preferably, the troughs are made of plastic similar to that of the grid structure so that welding can easily be performed. It is observed that the narrow horizontal slot 29 provides communication between the rib structure and the trough 16 at each end of the grid.

The entire grid structure, together with the end troughs are covered by the screen 9 and fabric 19, which when put to use will be coated with a coating of the filtering substances, ordinarily diatomaceous earth, which will fill the mesh of the fabric. The fabric covering of the grid is secured as by stitching 32, along the sides.

The description of the grid element and structure with reference to FIGS. 4 to 7 applies to each of the filter elements 13 in FIGS. 2 and 3. Each of the filter elements 14 being twice as wide as the elements 13, are made of two elements 13 welded together at 32, where their edge surfaces contact each other. The screen and the fabric covering 19 are then applied around the entire grid structure 14.

Above the assembly of elements 13 and 14 there is provided a header 33 suitably fastened within the tank and extending along the diameter of the tank along which the mouths 17 of the individual filter elements extend. The header 33 is in the general form of a pipe closed at both ends by caps 34 and provided at spaced intervals along its lower surface with openings 35 of the proper diameter to receive the upper ends of the respective mouths 17 which are slightly tapered to facilitate the desired tight fit. Thus the mouths 17 of all the filter elements open into the header 33.

A central opening 36 is provided through the upper surface of the header 33 which connects with a pipe elbow 37 which opens into a curved flange 38 of the proper dimension to fit over the header 33 to which it is fastened in a suitable manner which prevents leakage. The opposite end of elbow 37 has a hose connection 31 attached to it, the opposite end of which is clamped to a suitable pipe nipple 39 which may be threaded to be connected with suitable plumbing. By reason of the placing of the lower portions of lower troughs 16 in the notches of the support member 15 and the attachment of the mouths 17 of all the filter elements to the fixed header 33, the several filter elements 13 and 14 are held in their fixed positions parallel to each other and spaced apart as shown in FIGS. 2 and 3.

At the bottom of the tank there is provided an entrance pipe fitting 41 provided with suitable threads 42 for connection with proper plumbing, through which liquid can enter the tank. It is preferable to provide a deflector 43 within the tank in position to deflect the force of incoming liquid so that its force will not wash off the diatomaceous earth applied to the filter fabrics.

In the filtering operation, the liquid to be filtered is sent into the pipe entrance 41 in the direction of the arrow 44, which will fill the tank 10 with the liquid. To produce the desired filtering, a quantity of the filtering substance, ordinarily powdered diatomaceous earth, is put into the liquid being sent into the tank through channel 41, which will have the effect of coating all surfaces of the fabric 19 of all the filter elements, which will occur as the liquid is passing through the mesh of the fabric and into the interior 45 of each of the filter units. When the fabric is thus effectively coated with the diatomaceous earth, substantially all foreign particles will be collected at the coating and the liquid entering the interior 45 will be substantially free of such undesired matter. The filter liquid entering through all surfaces of the fabric will move upwardly within the interiors 45 along a tortuous path around the free sides of the ribs as indicated by arrows 46 (FIG. 6). At the upper end of the grid structure of each filter element, the liquid will pass through the narrow slot 29 and into the interior 47 within each the upper trough 16 of each filter element. Within the trough, the liquid will travel toward its center, as indicated by arrows 48 (FIG. 1) and emerge from mouth 17 into the header 33, where it will again travel toward the center as indicated by arrows 49 (FIG. 2) to the opening 36 from where it passes out of the filter through the exit conduit 39 in the direction of arrow 50 (FIG. 1). This is the normal filtering operation.

When the surfaces of the filter elements become unduly clogged with the filtered material so as to reduce the flow and filtering action, the filter according to common practice is brought back to normal efficiency by reversing the flow of liquid so that liquid for backwashing will be sent into channel 39 in the direction opposite that of arrow 50, so that it will emerge from the tank through channel 41 in the direction opposite the arrow 43. In doing this the liquid flows through the filtering elements in the direction opposite that of arrow 46 and in the reverse direction throughout the areas of the fabrics of all the filter elements thereby sweeping away the filtering substance, ordinarily diatomaceous earth, which had been adhering to the fabric surface, and carrying the accumulated dirt and other undesirable material out with it.

Regardless of the direction of liquid flow, it is important and highly desirable that the flow within the filter elements be controlled so that there is no excessive flow at any regions. This control is accomplished by means of the narrow straight slots 29 at the upper ends of the filter elements. If this control were not provided, there would be a tendency for a relatively heavy flow to occur in the region of the central vertical axis of the tank as this is the region nearest in line with the central opening 36 of the header 33. This would result in variations of the liquid flow through different areas of the fabric, both during normal filtering and during backwashing. But by restricting the flow at the upper slots 29, the tendency is to maintain an even pressure and uniform flow throughout each filter element and in all the filter elements, both during normal filtering and during backwashing. It has been found that a slot width of about 0.030 inch was satisfactory, although some variation from this may be desirable under some circumstances, depending on element dimensions and desired flow rates.

The lower slots 29 of each filter element do not perform any particular function during either filtering or backwashing. However, the symmetrical construction of each filter element and the provision of identical troughs 16 at the two ends prevents errors in assembly, as it does not matter which end of a filter element is placed upward.

Furthermore, the use of symmetrical rectangular grid structures 18 facilitates building filters of various sizes as it is possible to provide a filter element having only one grid 18, or alternatively, any number of such grids to build up a correspondingly larger grid, such as grids 14. This is done simply by welding the side edges of grids together.

The filter tank has been described herein as being vertical in that it can be positioned with its central longitudinal axis extending vertically and with the filter elements within it likewise extending vertically. The ability to place the filter in such vertical position is one of the advantages of this construction. It should be understood however, that the filter can be operated even though it is positioned with it central axis extending horizontally, or in some other position, in which case the planes of the filter elements within it would still lie parallel to the central axis. Accordingly, the term "vertical" as used herein does not necessarily signify that the grid elements must lie in a vertical position. Rather it signifies that the planes of the grid elements and the struts extend parallel to the central axis. Likewise the characterizing of the ribs as extending "horizontally" means that the ribs extend crosswise to the struts and to the central axis. Similarly, the flow control slots of the grid structures will extend horizontally only when the tank is in its usual vertical position.

What is claimed is:

1. A supporting grid unit for a filter element comprising:

a plurality of spaced vertical struts of equal thickness, extending substantially the length of said grid, the edges of which lie in vertical planes spaced by said thickness;

a plurality of spaced horizontally extending ribs attached to said struts;

alternate ones of said ribs having their outer edges lying in a first of said planes and their inner edges lying intermediate between said two planes;

the other alternate ones of said ribs having their outer edges lying in the second of said planes and their inner edges lying intermediate between said two planes;

and a flow control slot at the end-most one of said ribs at an end of said unit.

2. A grid unit according to claim 1 in which the unit is rectangular.

3. A grid unit according to claim 1 in which there is a second flow control slot at the end-most one of said ribs at the other end of said unit.

4. A grid unit according to claim 1 in which the slot is formed between an end one of said alternate ribs which extends to one of said planes and another rib which extends to a position short of the one of said planes.

5. A grid unit according to claim 1 in which a trough is attached at said end of said unit and said slot communicates between the unit and the trough.

6. Equipment according to claim 5 in which said grid unit and said trough are covered by a fabric mesh material to form a filter element.

7. Equipment according to claim 6 in which a conduit means connects with said trough.

8. Equipment comprising a plurality of filter elements according to claim 6 spaced apart in vertical planes within a filter tank.

9. Equipment according to claim 8 in which a header traverses the region adjacent the troughs of said filter elements and each trough is connected through a mouth opening to the header.

10. A unit according to claim 5 in which a second trough is attached at the other end of said unit and a second flow control slot communicates between said grid unit and said second trough.

11. Equipment according to claim 10 in which a fabric mesh material covers the unit and both troughs.

12. A filter grid supporting structure comprising a plurality of grid units according to claim 2 joined side-by-side at their side edges to form an enlarged grid structure.

* * * * *